(12) United States Patent
Lee et al.

(10) Patent No.: US 9,876,533 B2
(45) Date of Patent: Jan. 23, 2018

(54) METHODS AND SYSTEMS FOR VEHICLE COMMUNICATION TO A DATA NETWORK

(71) Applicant: The Boeing Company, Seal Beach, CA (US)

(72) Inventors: Donald B. Lee, Shoreline, WA (US); Timothy M. Mitchell, Seattle, WA (US); Brian E. Ward, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 1177 days.

(21) Appl. No.: 13/866,348

(22) Filed: Apr. 19, 2013

(65) Prior Publication Data

US 2014/0312682 A1    Oct. 23, 2014

(51) Int. Cl.
*H04B 3/56* (2006.01)
*H04B 3/54* (2006.01)

(52) U.S. Cl.
CPC ............... *H04B 3/56* (2013.01); *H04B 3/54* (2013.01); *H04B 2203/5408* (2013.01); *H04B 2203/5441* (2013.01); *H04B 2203/5445* (2013.01); *H04B 2203/5454* (2013.01); *H04B 2203/5483* (2013.01)

(58) Field of Classification Search
None
See application file for complete search history.

(56) References Cited

U.S. PATENT DOCUMENTS

| | | | |
|---|---|---|---|
| 7,749,030 B1 * | 7/2010 | Smith | H01R 11/282 439/754 |
| 7,893,557 B2 | 2/2011 | Davis et al. | |
| 9,306,625 B2 | 4/2016 | Lee | |
| 9,436,569 B2 | 9/2016 | Lee et al. | |
| 2002/0160773 A1 | 10/2002 | Gresham et al. | |
| 2005/0143868 A1 | 6/2005 | Whelan | |
| 2008/0195259 A1 | 8/2008 | Davis et al. | |
| 2008/0217996 A1 | 9/2008 | Niss | |
| 2010/0329247 A1 | 12/2010 | Kennedy et al. | |
| 2011/0007444 A1 | 1/2011 | Chang | |
| 2011/0035553 A1 * | 2/2011 | Shepstone | G06F 17/30902 711/135 |
| 2013/0003756 A1 * | 1/2013 | Mitchell | H04B 3/542 370/464 |
| 2013/0121042 A1 | 5/2013 | Gan et al. | |
| 2014/0049099 A1 | 2/2014 | Sampigethaya et al. | |
| 2014/0074321 A1 | 3/2014 | Lee et al. | |

FOREIGN PATENT DOCUMENTS

WO    2008097983 A1    8/2008

OTHER PUBLICATIONS

Extended European Search Report for European Patent Application No. 14157624; dated Apr. 25, 2014; 6 pages.
U.S. Appl. No. 13/606,119, filed Sep. 7, 2012.

* cited by examiner

*Primary Examiner* — Rexford Barnie
*Assistant Examiner* — Swarna N Chowdhuri
(74) *Attorney, Agent, or Firm* — Armstrong Teasdale LLP

(57) ABSTRACT

Methods, systems, and an integrated Broadband over Power Line (BPL) module cover assembly for communicating data between an aircraft and a ground-based network are provided. The assembly includes a power receptacle cover plate and a BPL module coupled to said power receptacle cover plate.

13 Claims, 5 Drawing Sheets

METHODS AND SYSTEMS FOR VEHICLE COMMUNICATION TO A DATA NETWORK

BACKGROUND

This invention relates generally to vehicle communication, and more particularly to vehicle broadband communication via a data network.

As technology has improved, an amount of software and data needed on-board vehicles has increased as well. This increased need for additional software and data management is particularly evident in aircraft information systems. Generally, aircrafts receive off-board data, for use in-flight, through a variety of methods. For example, cellular and/or satellite networks enable an aircraft to communicate to proprietary networks via the internet while the aircraft is in flight. However, such networks are generally limited by cellular or satellite connectivity.

In at least some known commercial airports, a GateLink™ network exists that enables aircraft to communicate wirelessly to an airport data network through the GateLink™ network. However, some commercial aircraft data cannot be sent via wireless networks due to regulations governing aircraft communications. Although such options may be available at some large commercial airports, because of cost limitations and technology limitations, for example, many regional airports and/or military air fields do not have GateLink™ capabilities.

Currently, at least some known wireless off-board communications solutions are required on-board an aircraft to communicate with the airport wireless network connectivity solutions. Broadband over Power Line (BPL) provides a high-bandwidth solution for commercial airports that utilize "wired" 400 Hz aircraft power infrastructure. However, when wired 400 Hz power infrastructure is not available, such as at regional or military air fields, in some instances, the operators may utilize portable self-contained ground power carts to provide alternating current (AC) power to the aircraft while the engines are off. Such methods include extra components for coupling with the aircraft, resulting in reduced data speed and efficiency, and increased component costs.

BRIEF DESCRIPTION

In one aspect, an integrated Broadband over Power Line (BPL) module cover assembly for communicating data between an aircraft and a ground-based network is provided. The assembly includes a power receptacle cover plate and a BPL module coupled to said power receptacle cover plate.

In another aspect, a system for communicating between an aircraft and a ground-based network is provided. The system includes a stinger connector configured to be coupled to a ground power stinger cable and an integrated Broadband over Power Line (BPL) module cover assembly coupled to said stinger connector and configured to communicate with the ground-based network.

In yet another aspect, a method of communicating between an aircraft and a ground-based network is provided. The method includes providing a stinger connector configured to be coupled to a ground power stinger cable and coupling an integrated Broadband over Power Line (BPL) module cover assembly to the stinger connector within the aircraft. The method also includes initiating a BPL link between the aircraft and the ground-based network when power is supplied to the aircraft and updating data stored in the aircraft with data received from the ground-based network.

The features, functions, and advantages that have been discussed can be achieved independently in various implementations or may be combined in yet other implementations further details of which can be seen with reference to the following description and drawings.

DETAILED DESCRIPTION

Figure 1:
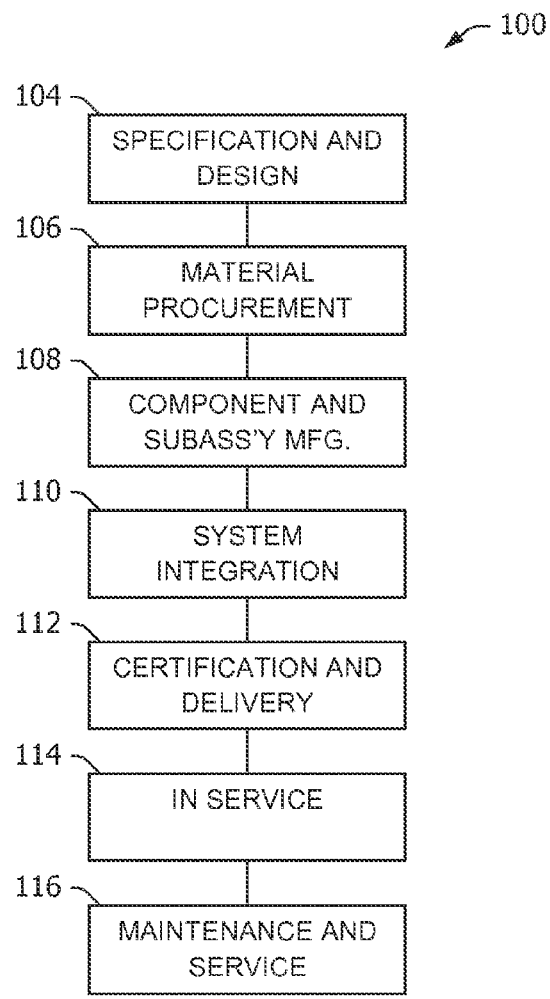
FIG. 1 is a flow diagram of an exemplary aircraft production and service methodology.
Figure 2:
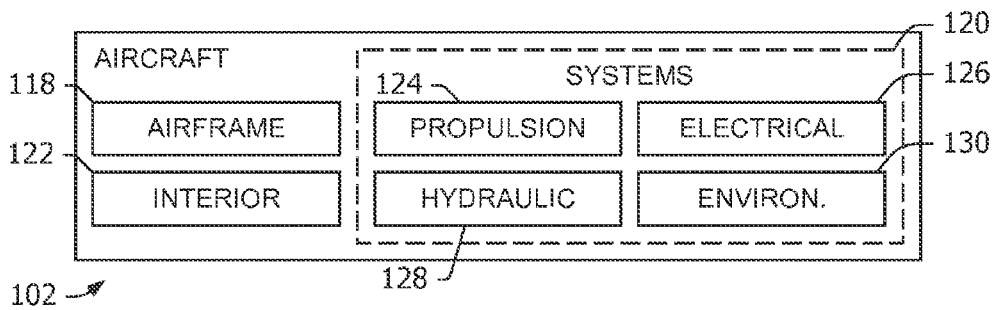
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of the aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, an aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included. Although an aircraft example is shown, the principles of the invention may be applied to non-aviation industries, such as the automotive industry.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

Figure 3:
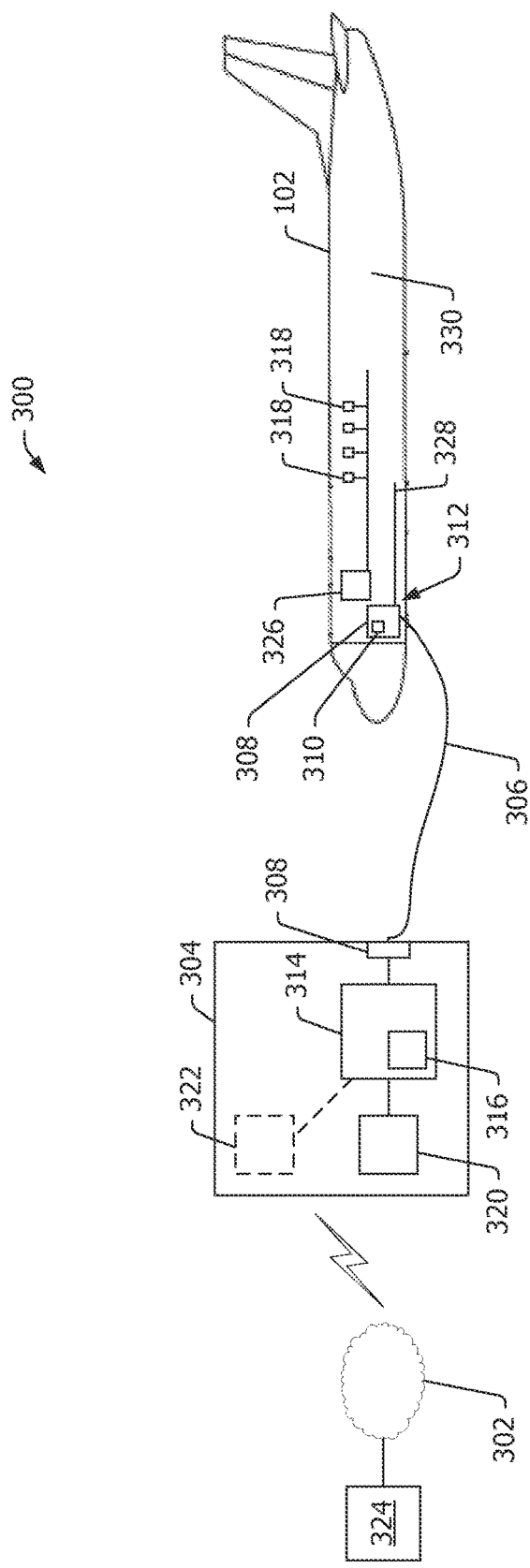
FIG. 3 is a diagram of an exemplary system that enables vehicle broadband communication with a data network.

FIG. 3 is a diagram of an exemplary system 300 for use in facilitating vehicle broadband communication with a data network 302. In the exemplary implementation, system 300 works with an aircraft 102 (shown in FIG. 2) on the ground at an airport (not shown). As used herein the term "airport" refers to any location in which aircraft, such as fixed-wing aircraft, helicopters, and/or blimps, take off and land. System 300 includes a power system 304 that supplies power to aircraft 102. In the exemplary implementation, power system 304 is a ground-based power cart, i.e., a ground power unit, that is mobile and that selectively supplies power to an aircraft parked on the ground at locations at, or adjacent to, the airport. In one implementation, power system 304 may be a conventional power delivery system used at least some known airports. Power system 304 is coupled to aircraft 102 when aircraft 102 is parked at the airport. An electrical cable 306, e.g., a power stinger cable, couples aircraft 102 to power system 304 via at least one stinger connector 308. In one implementation, power system 304 provides 400 Hz power to the aircraft via the electric cable 306. However in alternative implementations, any suitable power for a particular type of aircraft or vehicle may be provided via electric cable 306.

In the exemplary implementation, aircraft 102 includes an on-board BPL modem 310, or on-board BPL module 310, that enables communication via electrical cable 306. More particularly, in the exemplary implementation, on-board BPL modem 310 is coupled to stinger connector 308 to form an integrated BPL modem cover assembly 312 for stinger connector 308. BPL modem 310 is capable of communicating with an off-board BPL modem 314, or off-board BPL module 314, included in power system 304. In the exemplary implementation, BPL modem 310 is communicatively coupled to on-board networks 318. On-board networks 318, such as, but not limited to, in-flight entertainment systems, avionics systems, flight control systems, flight bag(s), and/or cabin systems.

In the exemplary implementation, power system 304 includes off-board BPL modem 314 coupled to an inductive coupler 316. Inductive coupler 316 couples BPL modem 314 to electrical cable 306. Inductive coupler 316 also transfers communications signals onto electrical cable 306. Power system 304 also includes a computing device 322 that can communicate directly with aircraft 102 to transfer data to networks 318. In the exemplary implementation, modem 314 is also coupled to a transceiver 320 that is communicatively coupled to ground-based network 302. For example, in one implementation, transceiver 320 is a wireless transceiver that transmits data to/from network 302. Transceiver 320 may be wirelessly coupled to network 302 or physically coupled to network 302 through a wired connection. It should be noted that transceiver 320 may communicate with network 302 using any protocol that enables broadband communication as described herein.

In the exemplary implementation, aircraft 102 receives electrical power from power system 304 via electrical cable 306 and sends/receives data communications to/from ground-based network 302 via cable 306. Moreover, in the exemplary implementation, aircraft 102 communicates via on-board BPL modem 310 using TCP/IP, however any other suitable protocol can be used. In one implementation, encryption is employed to further secure communications between aircraft 102 and ground-based network 302 and/or computing device 322.

Ground-based network 302 may be communicatively coupled to a server 324 that may be operated by the airline or entity that operates aircraft 102. Alternatively, server 324 may be operated by a third-party, such as the airport, an aircraft manufacturer, and/or an aircraft service provider. For example, server 324 may be coupled to ground-based network 302 via a LAN, a WAN, and/or the Internet. Server 324 may transmit data to and receive data from aircraft 102. For example, server 324 may provide software and/or firmware updates to components of aircraft 102, such as cabin systems software, flight bag, and avionics software. Server 324 may also provide content, such as music, movies, and/or internet data such as cached web content for in-flight entertainment systems on aircraft 102. In one implementation, system 300 is used to transfer data between aircraft 102 and ground-based network 302 during a quick-turn of aircraft 102. As used herein, a quick-turn is a quick turn-around time (i.e., less than about 30 minutes) of an aircraft at a gate between passenger deplaning and boarding. During a quick-turn, content of server 324 may be refreshed and data stored an on-board server 326 during a flight may be transmitted to ground-based network 302.

Although FIG. 3 illustrates power system 304 as being coupled to electrical cable 306 via off-board BPL modem 314, it should be appreciated that other configurations that enable off-board BPL modem 314 to function as described herein are possible. For example, off-board BPL modem 314 may communicate wirelessly with modem 310 when aircraft 102 is directly coupled to power system 304 via electrical cable 306. As another example, off-board BPL modem 314 may be configured to communicate wirelessly with the aircraft via computing device 322 while at the same time, communicate via electrical cable 306 when power is supplied from power system 304 to the aircraft 102.

Figure 4:
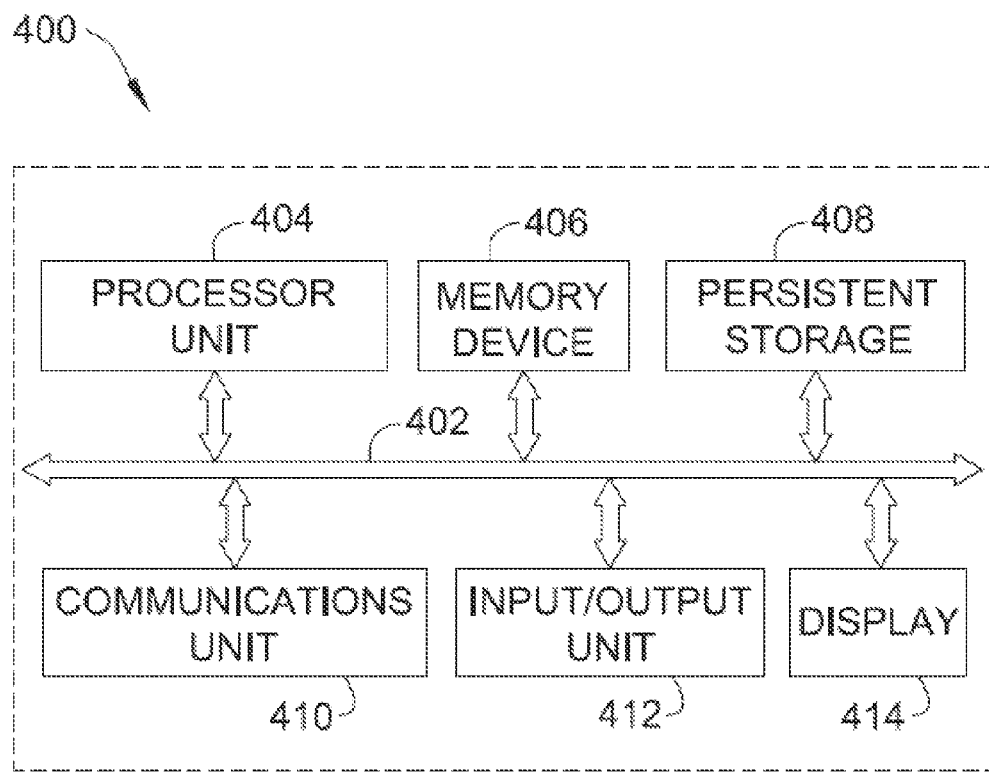
FIG. 4 is a block diagram of an exemplary computing device that may be used with the system shown in FIG. 3.

FIG. 4 is a block diagram of an exemplary computing device 400 that may be used with system 300 (shown in FIG. 3). In the exemplary implementation, computing device 400 is incorporated into power system 304. However, it should be noted that computing device 400 may be a separate device that cooperates with power system 304 such as computing device 322. In the exemplary implementation, computing device 400 includes a communications fabric 402 that enables communications between a processor unit 404, a memory 406, persistent storage 408, a communications unit 410, an input/output (I/O) unit 412, and a presentation interface, such as a display 414. In addition to, or in the alternative, presentation interface 414 may include an audio device (not shown) and/or any device capable of conveying information to a user.

Processor unit 404 executes instructions for software that may be loaded into memory 406. Processor unit 404 may be a set of one or more processors or may include multiple processor cores, depending on the particular implementation. Further, processor unit 404 may be implemented using one or more heterogeneous processor systems in which a main processor is present with secondary processors on a single chip. In another implementation, processor unit 404 may be a homogeneous processor system containing multiple processors of the same type.

Memory 406 and persistent storage 408 are examples of storage devices. As used herein, a storage device is any piece of hardware that is capable of storing information either on a temporary basis and/or a permanent basis. A storage device, such as memory 406 and/or persistent storage 408, may be configured to store data for use with the processes described herein. For example, a storage device may store data needed by networks 318 (shown in FIG. 3) during flight.

Communications unit 410, in the exemplary implementation, enables communications with other computing devices, systems, and/or networks. In the exemplary implementation, communications unit 410 is a BPL modem such as modem 310 and modem 314. In one implementation, communications unit 410 also includes a network interface card. Communications unit 410 may provide communications through the use of physical and/or wireless communication links, such as transceiver 320.

Input/output unit 412 enables input and output of data with other devices that may be connected to computing device 400. For example, without limitation, input/output unit 412 may provide a connection for user input through a user input device, such as a keyboard and/or a mouse. Further, input/output unit 412 may transmit output to a printer. Display 414 provides a mechanism to display information to a user. For example, a presentation interface such as display 414 may display a graphical user interface, such as those described herein.

The different components illustrated herein for computing device 400 are not architectural limitations to the manner in which different implementations may be implemented. Rather, the different illustrative implementations may be implemented in a computer system including components in addition to or in place of those illustrated for computing device 400. For example, other components shown in FIG. 4 can be varied from the illustrative examples shown.

During operation, and referring to FIGS. 3 and 4, aircraft 102 is connected to a ground power unit (GPU), e.g., ground power unit 304, via electric cable 306, e.g., a power stinger cable. The authorized ground personnel activates off-board BPL modem 314 and completes an authentication procedure using off-board BPL modem 314, display 414, and/or I/O unit 412. A pilot, maintenance crewmember, or other authorized user activates an on-board BPL modem, (e.g., on-board BPL modem 310). On-board BPL modem 310 establishes communication with off-board BPL modem 314. Aircraft 102 is then coupled to off-board BPL modem 314 via electric cable 306 and is coupled to ground-based network 302, server 324, computing device 322, and/or the Internet. Communication between aircraft 102 and power unit 304 may be initiated autonomously or at the direction of a user, such as a pilot or ground crew member.

Figure 5:
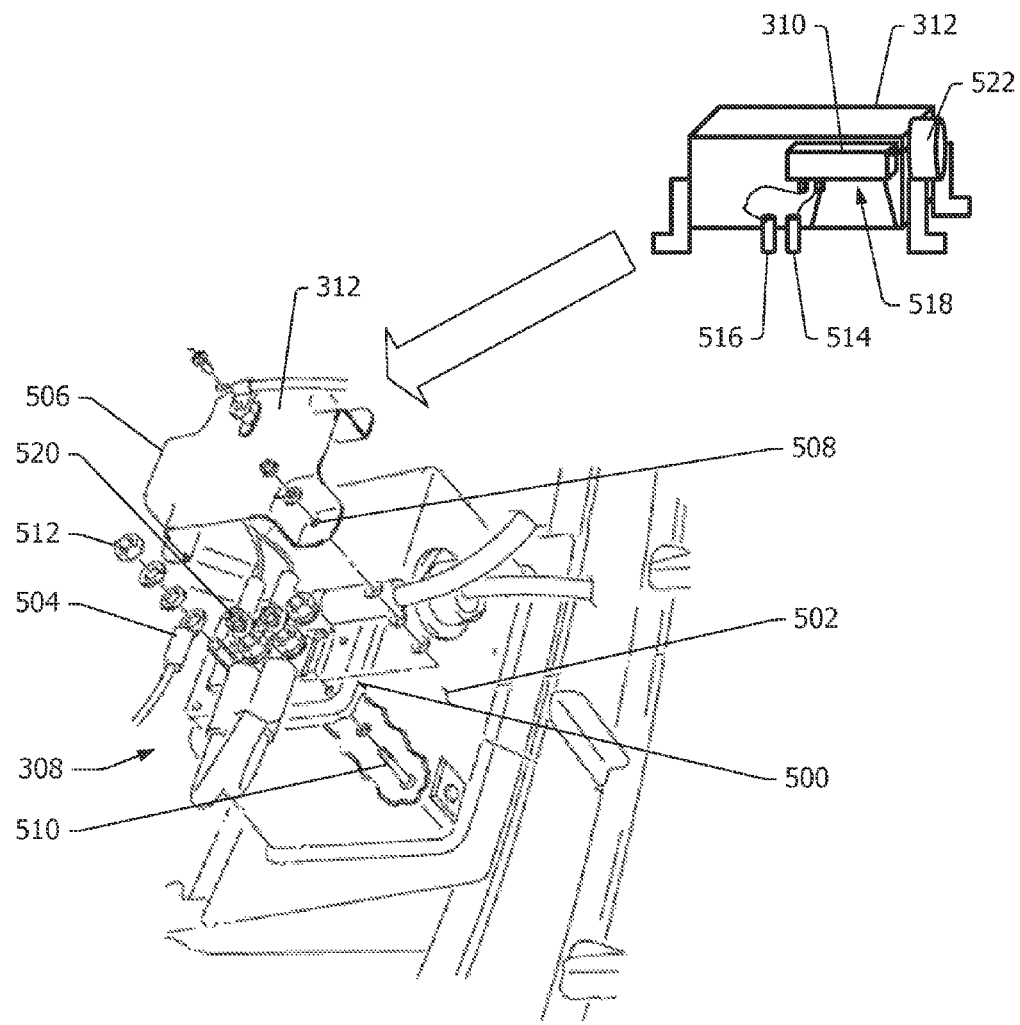
FIG. 5 is a block diagram of an exemplary integrated BPL modem cover assembly configured to be coupled to the stinger connector shown in FIG. 3.

FIG. 5 is a block diagram of an exemplary integrated BPL modem cover assembly 312 configured to be coupled to stinger connector 308 (shown in FIG. 3). In the exemplary implementation, integrated BPL modem cover assembly 312 includes BPL modem 310 (shown in FIG. 3) coupled to stinger connector 308 (shown in FIG. 3) in a single device. Stinger connector 308 includes an external power receptacle 500 that includes an external power receptacle pan 502. Power receptacle 500 also includes electrical leads 504 that receive power from electrical cable 306 and distribute the power to a power bus 328 (shown in FIG. 3) of aircraft 102. Stinger connector 308 also includes a cover plate 506 configured to provide electrical protection to other components and mechanics.

In the exemplary implementation, BPL modem 310 is coupled directly to stinger connector 308 rather than by an interface cable. More specifically, BPL modem 310 is integrated with cover plate 506 to form integrated BPL modem cover assembly 312. Assembly 312 includes a connection hole 508 at each corner that mates with a bolt 510 at each corner of power receptacle 500. Integrated BPL modem cover assembly 312 is secured onto bolts 510 using lugs 512. In one implementation, assembly 312 is secured using spring sockets that lock on bolts 510 to provide a good electrical connection. Assembly 312 also includes a first phase connector 514 and a neutral connector 516 electrically coupled to a bottom portion 518 of BPL modem 310. First phase connector 514 and neutral connector 516 each couple with an associated pin 520 included in power receptacle 500 upon installation. Assembly 312 also includes an Ethernet connector 522 for coupling to an Ethernet interface (not shown) on-board aircraft 102.

Figure 6:
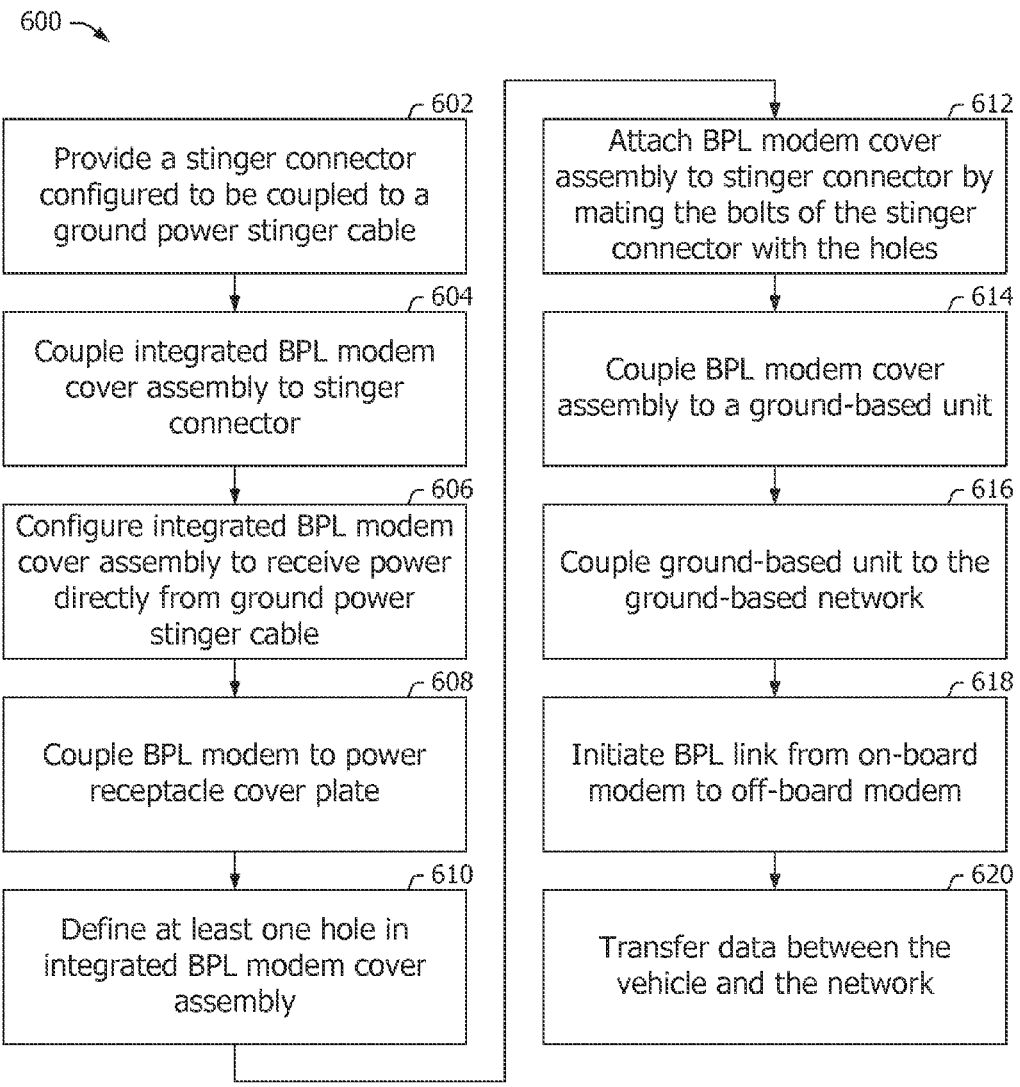
FIG. 6 is a flowchart of an exemplary method that may be implemented to enable vehicle broadband communication with a data network.

FIG. 6 is a flowchart of an exemplary method 600 that may be implemented to enable vehicle broadband communication with a data network. In the exemplary implementation, a stinger connector 308 configured to be coupled to a ground power stinger cable 306 is provided 602 in the vehicle, for example aircraft 102. An integrated Broadband over Power Line (BPL) modem cover assembly 312 is coupled 604 to stinger connector 308 within the vehicle. In one implementation, integrated BPL modem cover assembly 312 is configured to receive 606 power directly from ground power stinger cable 306. For integrated BPL modem cover assembly 312 to receive 606 power directly from ground power stinger cable 306, BPL modem 310 is coupled 608 to power receptacle cover plate 506 to form integrated BPL modem cover assembly 312. At least one hole 508 is defined 610 in integrated BPL modem cover assembly 312. Integrated BPL modem cover assembly 312 is attached 612 to stinger connector 308 by mating at least one bolt 510 of stinger connector 308 with the at least one hole 508. In some implementations, integrated BPL modem cover assembly 312 is communicatively coupled 614 to a ground-based unit 304 via one of a wireless connection and the ground power stinger cable. Ground-based unit 304 is then communicatively coupled 616 to ground-based network 302.

When power is supplied to the vehicle, a BPL link from modem 310 to modem 314 is initiated 618. In the exemplary implementation, data is then transferred and/or updated 620 between the vehicle and network 302 and/or computing device 322. In one implementation, data is updated 620 using cached web content that may be later accessed.

An exemplary technical effect of the methods and systems described herein includes at least one of: (a) providing a stinger connector configured to be coupled to a ground power stinger cable; (b) coupling an integrated Broadband over Power Line (BPL) modem cover assembly to the stinger connector within the vehicle; (c) initiating a BPL link between the vehicle and the ground-based network when power is supplied to the vehicle; and (d) updating data stored in the vehicle with data received from the ground-based network.

The implementations described herein provide an integrated BPL modem cover assembly that enables vehicle broadband communication with a data network. As compared to known communication methods and systems used for airport-based aircraft communications, the above-described implementations provide a smaller and lighter BPL modem cover assembly resulting in reduced costs and increased efficiency of BPL communications. The integrated BPL modem cover assembly may be installed into new power systems or retrofitted into existing power systems. Moreover, the integrated BPL modem cover assembly being implemented as a single component facilitates easier installation and reduces the potential for damage during installation. Although aircraft have been used as an example throughout, it is contemplated that other vehicles, such as electric and/or maritime vehicles, may be used with the methods and systems described herein.

It will be understood by those of skill in the art that information and signals may be represented using any of a variety of different technologies and techniques (e.g., data, instructions, commands, information, signals, bits, symbols, and chirps may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred implementations of the present disclosure have been described in detail, it will be understood by those skilled in the art that various modifications can be made therein without departing from the scope of the disclosure as set forth in the appended claims.

A controller, computing device, or computer, such as described herein, including the on and off-board BPL modems, may include at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An integrated Broadband over Power Line (BPL) module cover assembly for communicating between an aircraft and a ground-based network, said integrated BPL module cover assembly comprising:
a power receptacle cover plate configured to be coupled to a stinger connector onboard the aircraft, the stinger connector configured to receive a ground power stinger cable associated with a ground-based power unit, said power receptacle cover plate configured to cover a plurality of electrical leads extending through a power receptacle of the stinger connector to a power bus of the aircraft; and
a BPL module integrated with said power receptacle cover plate and comprising a first phase connector configured to be electrically coupled to a first power receptacle pin of the power receptacle and a neutral connector configured to be electrically coupled to a second power receptacle pin of the power receptacle for electrically coupling directly to at least one of the plurality of electrical leads of the stinger connector, said BPL module configured to receive power and communicate with the ground-based network via the ground power stinger cable.

2. An integrated BPL module cover assembly in accordance with claim 1, wherein said integrated BPL module cover assembly comprises at least one hole defined therein configured to mate with the stinger connector via at least one bolt.

3. An integrated BPL module cover assembly in accordance with claim 1, wherein said first phase connector and said neutral connector are coupled to said BPL module.

4. An integrated BPL module cover assembly in accordance with claim 1, further comprising an Ethernet connector configured to be coupled to an Ethernet interface of the aircraft.

5. A system for communicating between an aircraft and a ground-based network, said system comprising:
a stinger connector onboard the aircraft and configured to be coupled to a ground power stinger cable associated with a ground-based power unit, said stinger connector comprising a power receptacle and a plurality of electrical leads for receiving power from the ground power stinger cable and extending through the power receptacle into the aircraft; and
an integrated Broadband over Power Line (BPL) module cover assembly coupled to said stinger connector and configured to communicate with the ground-based network, said integrated BPL module cover assembly comprising:
a power receptacle cover plate configured to be coupled to said stinger connector, said power receptacle cover plate configured to cover the plurality of electrical leads extending through said power receptacle of said stinger connector to a power bus of the aircraft, said power receptacle comprising a first power receptacle pin and a second power receptacle pin configured to output power received from the ground power stinger cable;

a BPL module integrated with said power receptacle cover plate and comprising a connector for electrically coupling directly to at least one of the plurality of electrical leads of said stinger connector, said BPL module configured to receive power and communicate with the ground-based network via the ground power stinger cable;
a first phase connector configured to be electrically coupled to said first power receptacle pin; and
a neutral connector configured to be electrically coupled to said second power receptacle pin.

6. A system in accordance with claim 5, wherein said BPL module is coupled directly to the ground power stinger cable.

7. A system in accordance with claim 5, wherein said power receptacle comprises:
at least one bolt for engaging with at least one hole defined in said integrated BPL module cover assembly; and
at least one lug for securing said integrated BPL module cover assembly onto said at least one bolt.

8. A system in accordance with claim 5, wherein said power receptacle comprises a first power receptacle pin and said second power receptacle pin are configured to output power received from the ground power stinger cable.

9. A method of communicating between an aircraft and a ground-based network, said method comprising:
providing a stinger connector onboard the aircraft configured to be coupled to a ground power stinger cable associated with a ground-based power unit, the stinger connector including a power receptacle and a plurality of electrical leads for receiving power from the ground power stinger cable and extending through the power receptacle to a power bus of the aircraft;
coupling an integrated Broadband over Power Line (BPL) module cover assembly to the stinger connector within the aircraft, the integrated BPL module cover assembly including a power receptacle cover plate configured to be coupled to said stinger connector, said power receptacle cover plate configured to cover the plurality of electrical leads extending through the power receptacle of the stinger connector into the aircraft, and a BPL module integrated with the power receptacle cover plate and including a first phase connector configured to be electrically coupled to a first power receptacle pin of the power receptacle and a neutral connector configured to be electrically coupled to a second power receptacle pin of the power receptacle for electrically coupling directly to at least one of the plurality of electrical leads of the stinger connector, the BPL module configured to receive power and communicate with the ground-based network via the ground power stinger cable;
initiating a BPL link between the aircraft and the ground-based network when power is supplied to the aircraft; and
updating data stored in the aircraft with data received from the ground-based network.

10. A method in accordance with claim 9, further comprising configuring the integrated BPL module cover assembly to receive power directly from the ground power stinger cable.

11. A method in accordance with claim 10, wherein configuring the integrated BPL module cover assembly to receive power directly from the ground power stinger cable further comprises:
defining at least one hole in the integrated BPL module cover assembly; and
attaching the integrated BPL module cover assembly to the stinger connector by mating at least one bolt of the stinger connector with the at least one hole.

12. A method in accordance with claim 9, wherein updating data further comprises updating data using cached web content.

13. A method in accordance with claim 9, further comprising:
communicatively coupling the BPL module cover assembly to a ground-based unit via one of a wireless connection and the ground power stinger cable; and
communicatively coupling the ground-based unit to the ground-based network.

* * * * *